United States Patent
Todd et al.

(10) Patent No.: US 10,873,195 B2
(45) Date of Patent: Dec. 22, 2020

(54) APPARATUS, METHOD, AND SYSTEM FOR SECURELY CHARGING MOBILE DEVICES

(71) Applicants: Emory Todd, Atlanta, GA (US); Kristen Todd Gaeta, Palm Beach Gardens, FL (US); Robert M. Brinson, Jr., Rome, GA (US)

(72) Inventors: Emory Todd, Atlanta, GA (US); Kristen Todd Gaeta, Palm Beach Gardens, FL (US); Robert M. Brinson, Jr., Rome, GA (US)

( * ) Notice: Subject to any disclaimer, the term of this patent is extended or adjusted under 35 U.S.C. 154(b) by 0 days.

(21) Appl. No.: 16/232,352

(22) Filed: Dec. 26, 2018

(65) Prior Publication Data
US 2019/0131807 A1 May 2, 2019

Related U.S. Application Data

(63) Continuation of application No. 15/689,564, filed on Aug. 29, 2017, now abandoned, which is a (Continued)

(51) Int. Cl.
*H02J 7/00* (2006.01)
*G06K 9/00* (2006.01)
(Continued)

(52) U.S. Cl.
CPC ............ *H02J 7/0044* (2013.01); *G06F 21/32* (2013.01); *G06F 21/44* (2013.01);
(Continued)

(58) Field of Classification Search
CPC .......... H02J 7/0044; H02J 7/00; H02J 7/0052; H02J 7/025; H02J 2007/0062;
(Continued)

(56) References Cited

U.S. PATENT DOCUMENTS 6,212,410 B1  4/2001  Ishida
7,284,279 B2  10/2007  Morrison
(Continued)

FOREIGN PATENT DOCUMENTS

CN  203339735 U  12/2013
EP  2 101 390 A2  9/2009
(Continued)

OTHER PUBLICATIONS

Charger Lock Press; Local Family's Frustration Sparks New Invention; Apple iPhone Charger lock; http://www.ichargerlock.com/#!press/cgbd; 3 pages.
(Continued)

*Primary Examiner* — M Baye Diao
(74) *Attorney, Agent, or Firm* — Maier & Maier, PLLC

(57) ABSTRACT

A secure mobile device charger for charging batteries of mobile devices. The secure mobile charger can include one or more body housing battery charging elements; a power connector; a mobile device connector; a code receiver; and a switch that prevents unauthorized battery charging from the mobile device connector. The code receiver may receive a code transmitted from the power source in the form of a variation in the electrical power supplied by the power source, which may be used to provide authorization to enable battery charging from the mobile device connector.

17 Claims, 5 Drawing Sheets

Related U.S. Application Data continuation of application No. 14/731,939, filed on Jun. 5, 2015, now Pat. No. 9,774,200.

(51) Int. Cl.
  *G06F 21/32* (2013.01)
  *G06F 21/44* (2013.01)
  *H02J 7/02* (2016.01)

(52) U.S. Cl.
  CPC ............ *G06K 9/00006* (2013.01); *H02J 7/00* (2013.01); *H02J 7/025* (2013.01); *G06K 9/00013* (2013.01); *H02J 7/00045* (2020.01)

(58) Field of Classification Search
  CPC .. H02J 2007/0001; G06F 21/44; G06F 21/32; G06K 9/00006; G06K 9/00013
  USPC ....................................................... 320/137
  See application file for complete search history.

(56) References Cited

U.S. PATENT DOCUMENTS

| | | | |
|---|---|---|---|
| 7,667,429 | B2 | 2/2010 | Little |
| 8,155,697 | B2 | 4/2012 | Harris |
| 8,255,720 | B1* | 8/2012 | Conway ............... G01C 21/367 713/320 |
| 8,467,770 | B1 | 6/2013 | Ben Ayed |
| 8,468,076 | B2* | 6/2013 | Cheung .................... G06F 1/26 705/35 |
| 8,539,590 | B2 | 9/2013 | Lee et al. |
| 8,547,059 | B2 | 10/2013 | Kurumizawa et al. |
| 8,584,243 | B2* | 11/2013 | Britton .................... G06F 21/56 713/188 |
| 8,712,486 | B2 | 4/2014 | Sorias |
| 8,718,717 | B2 | 5/2014 | Vaknin et al. |
| 8,723,642 | B2 | 5/2014 | Park et al. |
| 8,860,375 | B2 | 10/2014 | Chen |
| 8,879,986 | B2 | 11/2014 | Fisher |
| 9,088,305 | B2* | 7/2015 | Jurgovan ................ H02J 50/90 |
| 9,092,623 | B2* | 7/2015 | Britton .................... G06F 21/56 |
| 9,100,493 | B1 | 8/2015 | Zhou |
| 9,195,817 | B2 | 11/2015 | Scully-Power et al. |
| 9,252,605 | B1* | 2/2016 | Custon .................. H02J 7/0042 |
| 9,301,337 | B2 | 3/2016 | Brown |
| 9,318,904 | B2 | 4/2016 | Malladi |
| 9,411,386 | B2 | 8/2016 | Sauerwein, Jr. |
| 9,436,220 | B2 | 9/2016 | Rosenberg et al. |
| 9,472,909 | B2* | 10/2016 | Ginsberg ............. H02J 7/0044 |
| 9,501,881 | B2 | 11/2016 | Saeedi et al. |
| 9,613,282 | B2 | 4/2017 | Weiss |
| 9,615,254 | B2* | 4/2017 | Lord ....................... H02J 50/90 |
| 2004/0015958 | A1 | 1/2004 | Veil |
| 2005/0097046 | A1 | 5/2005 | Singfield |
| 2005/0263596 | A1 | 12/2005 | Nelson et al. |
| 2009/0072782 | A1 | 3/2009 | Randall |
| 2009/0280871 | A1 | 11/2009 | Hofer |
| 2011/0050164 | A1* | 3/2011 | Partovi ................... H01F 38/14 320/108 |
| 2011/0136550 | A1* | 6/2011 | Maugars ................ H02J 50/80 455/573 |
| 2011/0140656 | A1 | 6/2011 | Starr et al. |
| 2012/0019379 | A1 | 1/2012 | Ben Ayed |
| 2012/0133325 | A1 | 5/2012 | Thomas et al. |
| 2012/0143707 | A1 | 6/2012 | Jain |
| 2012/0262112 | A1 | 10/2012 | Ross |
| 2012/0268238 | A1 | 10/2012 | Park et al. |
| 2012/0299547 | A1 | 11/2012 | Lee et al. |
| 2013/0260677 | A1* | 10/2013 | Partovi ............... H02J 7/00304 455/41.1 |
| 2013/0297844 | A1 | 11/2013 | Rosenberg et al. |
| 2014/0154535 | A1 | 6/2014 | Olsson |
| 2014/0306654 | A1 | 10/2014 | Partovi |
| 2015/0016697 | A1 | 1/2015 | Kerr |
| 2015/0194834 | A1 | 7/2015 | Lee |
| 2015/0201723 | A1 | 7/2015 | Rayner |
| 2015/0236528 | A1 | 8/2015 | Kim |
| 2015/0286965 | A1 | 10/2015 | Amano et al. |
| 2016/0149418 | A1 | 5/2016 | Jung |
| 2017/0323285 | A1 | 11/2017 | Xing |

FOREIGN PATENT DOCUMENTS

| | | |
|---|---|---|
| JP | 2006-279844 A | 10/2006 |
| JP | 2010-166659 A | 7/2010 |
| JP | 2012-159627 A | 8/2012 |
| JP | 2013-009491 A | 1/2013 |
| JP | 2013-110953 A | 6/2013 |
| JP | 2013-115978 A | 6/2013 |
| JP | 2015-8524 A | 1/2015 |
| JP | 2015-033318 A | 2/2015 |
| KR | 10-2009-0111466 A | 10/2009 |
| KR | 10-2015-0047050 A | 5/2015 |
| TW | 201322198 A | 6/2013 |
| WO | 2015/063967 A1 | 5/2015 |

OTHER PUBLICATIONS

Donny Jacob Ohana, et al; Preventing Cell Phone Intrusion and Theft Using Biometrics; Fingerprint Biometric Security Utilizing Dongle and Solid Relay Technology; 2013 IEEE Security and Privacy Workshops; pp. 173-180.

Notification of Transmittal of the International Search Report and the Written Opinion of the International Searching Authority dated Aug. 30, 2016, in connection with corresponding International Application No. PCT/US2016/035702 (12 pgs.).

Extended European Search Report dated Sep. 7, 2018, including the Supplementary European Search Report and the European Search Opinion, in connection with corresponding EP Application No. 16804519.3 (7 pgs.).

Korean Office Action dated Mar. 13, 2019, in connection with corresponding KR Application No. 10-2017-7035131 (13 pgs., including English translation).

Japanese Office Action dated Jan. 29, 2019, in connection with corresponding JP Application No. 2018-515191 (19 pgs., including machine-generated English translation).

Office Action dated Sep. 24, 2019, in corresponding Japanese Application No. 2018-515191; 18 pages.

Office Action dated Sep. 30, 2019, in corresponding Korean Application No. 10-2017-7035131; 16 pages.

Office Action dated Mar. 18, 2020 in corresponding Indian Application No. 201727042249; 7 pages.

Chinese Office Action dated Aug. 28, 2020, in connection with corresponding CN Application No. 201680032943.X (26 pp., including machine-generated English translation).

Office Action dated May 19, 2020, in corresponding Japanese Application No. 2018-515191; 15 pages.

\* cited by examiner

APPARATUS, METHOD, AND SYSTEM FOR SECURELY CHARGING MOBILE DEVICES

CROSS-REFERENCE TO RELATED APPLICATIONS

This application is a continuation of U.S. patent application Ser. No. 15/689,564, filed Aug. 29, 2017, which is a continuation-in-part of U.S. patent application Ser. No. 14/731,939, filed on Jun. 5, 2015, entitled "Apparatus, Method, and System for Securely Charging Mobile Devices," the entire contents of which are hereby incorporated by reference.

BACKGROUND

Mobile communication devices, and other mobile electronic devices, are commonly used in almost every environment. The mobile devices can be phones, smart phones, tablets, tablet-phones, computers, and the like, and may provide their users with any of a variety of capabilities. Although many mobile communication devices provide telephone capabilities, they are relied on more frequently for internet access, social media access, email access, video and audio downloading and playback capabilities, and other properties in work and entertaining environments.

The myriad capabilities of such mobile communication devices utilize various amounts of power. Although battery technology is consistently being improved, the battery life of a mobile communication device can dictate its usefulness or effectiveness. Additionally, although some capabilities of mobile communication devices are known as battery friendly, such as audio or music playback and Wifi internet usage, others require significantly more power consumption by the mobile communication device. For example, data network usage (such as EDGE, 3G, 4G, LTE, and the like), video playback, video recording, and social media access and social media gaming often utilize a wide variety of a mobile communication device's processing and power capabilities, providing a shorter useful life of the mobile communication device until it needs to be recharged.

Recharging mobile communication devices is then an issue because the environments where they are often plugged in and recharged are not typically secure environments. As mobile communication devices are frequently used outside of home and office environments, charging solutions are often sought by users. Users often have charging devices with them, but often fear theft of the charging device or other people simply unplugging their mobile communication device and using it with another device. Also, in some locations, such as airports and coffee shops, recharging stations are often provided for consumer use. However, mobile communication devices typically take a substantial amount of time to recharge and, in order to prevent removal, unauthorized access, or theft of their mobile communication device, users must monitor or be physically present or proximate to the charging stations or other locations that are being used to charge the mobile communication devices. Thus it is desired to provide a manner of securely charging a mobile communication device that provides a user with additional security.

SUMMARY

In one exemplary embodiment, a secure mobile device charging device may be shown and described. The secure mobile device charger can have a body housing battery charging elements; a power connector; a mobile device connector; a biometric sensor that reads biometric input data; and a switch that prevents unauthorized battery charging from the mobile device connector.

In another exemplary embodiment, a system for charging a mobile communication device may be shown and described. This exemplary embodiment may include a mobile communication device; a power source; a cord; and a mobile communication device charger. The charger may further have a body housing battery charging elements; a power connector; a mobile device connector; a biometric sensor that reads biometric input data; and a switch that prevents unauthorized battery charging from the mobile device connector.

In still another exemplary embodiment, a method for having a secure mobile device charger may be shown and described. The method can include connecting a battery charging device to a power source; connecting a mobile device to the battery charger; supplying, temporarily, power to the mobile device from the battery charger; prompting input of biometric information on a biometric sensor on the battery charger; inputting biometric information on the biometric sensor; comparing the inputted biometric information with stored, authorized biometric information; providing continuous power from the battery charger to the mobile device when the inputted biometric information is authorized; and ceasing the temporary supply of power from the battery to the mobile device when the inputted biometric information is not authorized.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, and generally referring to FIGS. 1-6, a secure mobile device battery charger, system, and method for using may be shown and described. The secure mobile device battery charger may be utilized with any of a variety of mobile devices, as described herein. The secure mobile device battery charger may be such that it can provide battery charging, or other power capabilities, based on a desired input or entry of a security code. The secure mobile device battery charger can further prevent unauthorized or undesired devices from being charged while connected to the secure mobile device battery charger.

Figure 1A:
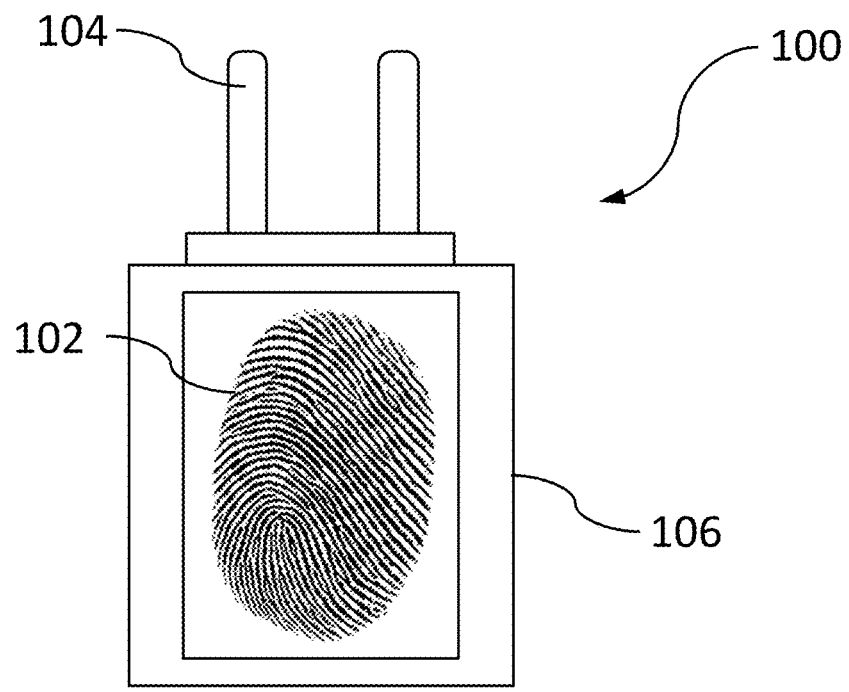
FIG. 1A is an exemplary view of a secure mobile communication device battery charger.
Figure 1B:
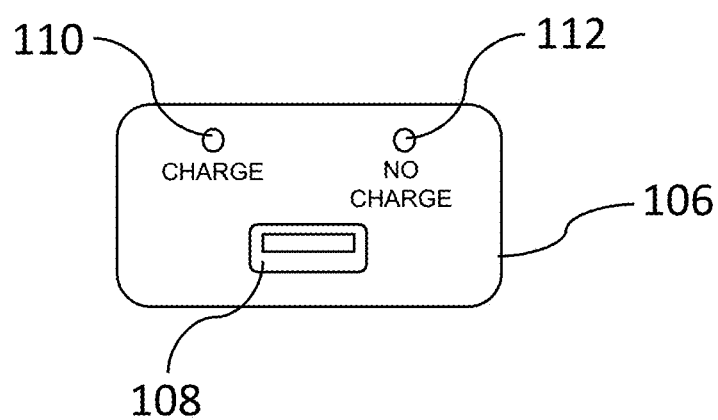
FIG. 1B is another exemplary view of a secure mobile communication device battery charger.

In exemplary FIGS. 1A and 1B, and in one embodiment, a mobile communication device charger 100 may be shown and described. The mobile communication device charger 100 may include any of a variety of components and functionality. For example, the mobile communication device charger 100 can include an integrated biometric sensor 102, or another input sensor or component, which may allow for the input of data. In this exemplary embodiment, the charger 100 may be a charger usable with any type of mobile device including, but not limited to, mobile phones, tablets, portable computers, laptop computers, mobile audio and/or video devices, and the like. It may be appreciated that the charger 100 can be connected to AC power, a USB port, or the like, by power connector 104. In exemplary FIGS. 1A and 1B, power connector 104 is shown as a plug with a pair of prongs. However, in other exemplary embodiments, power connector 104 may be a cable, cord, USB dongle, micro-USB dongle, or any other proprietary or non-proprietary power connector or power-capable connector that may be coupled to a power source. The charger 100 may further have a body portion 106 and a mobile device connector 108. The mobile device connector 108 may be a port that allows a cable (not pictured) to be connected to the mobile device connector 108. A port used as mobile device connector 108 may be a USB port, micro-USB port, AC port, headphone port, or any other connector capable of communicatively coupling, and provide power to, a mobile communication device. Additionally, although the term "mobile communication device" is used in various parts of this description, it should be appreciated that any mobile device or electronic device may be utilized with charger 100. For example, a USB cord may be connected from a mobile communication device to the mobile communication device charger 100 via mobile device connector 108. In this example the USB cord may have a first end that is connected to the body 106 of mobile communication device charger 100 through mobile device connector 108 and a second end that is connected directly to the mobile communication device.

It may further be appreciated that body 106 may house any charging elements or components (not pictured) for providing charging capabilities from charger 100 to a device connected thereto. For example, housed in body 106 may be a transformer, for example, to convert high voltage to low voltage. It may further include a rectifier that can convert AC voltage from the transformer to DC voltage. Body 106 may further have a filter, which may provide for capacitive filtering, to filter the DC voltage into a smooth, usable output. Body 106 may further include a regulator that can remove irregularities and inconsistencies from the output signal in order to provide a desired output to charge a mobile device.

In some other exemplary embodiments, it may be appreciated that mobile communication device charger 100 may communicate with a mobile communication device through wireless transmission. In such exemplary embodiments, mobile communication device charger may include a Wi-Fi transmitter, data network transmitter (such as, but not limited to, EDGE, 3G, 4G, 5G, LTE, and the like), modem, or any other device that may communicate data to and from the mobile communication device charger 100 and which may be housed in body 106. Additionally, it may be appreciated that mobile communication device charger 100 may communicate in a wired or wireless fashion with any of a variety of devices. Such communications can take place between the mobile communication device charger 100 and a mobile communication device to be charged, multiple mobile communication devices to be charged, a remotely located server, or the like.

In still other exemplary embodiments, it may be appreciated that wireless power transmission may be utilized with the mobile communication device charger 100. In such an exemplary embodiment, the body 106 of mobile communication device charger 100 may be formed as a pad, as utilized for wireless power transmission, or may take any other appropriate form. Wireless power transmission may then be effected through use of inductive coupling, resonant inductive coupling, capacitive coupling, or any other wireless power transmission methodology. Wireless data transmission may still be accomplished through any of the manners described herein.

Still referring to exemplary FIGS. 1A and 1B, the body 106 of the charger 100 can have a biometric device 102 mounted thereon. The biometric device 102 may be such that it can read biometric data to provide or deny access or capabilities associated with the charger 100. For example, the biometric device 102 may be coupled to or capable of actuating a locking mechanism or lockout capabilities associated with the charger 100. Such capabilities can include, but are not limited to, providing power or charging capabilities to an authorized mobile device or authorized user, transmitting an accepted message to an authorized device or unauthorized device regarding access to the charger 100, denying power or preventing charging of an unauthorized device, data and/or communication transmissions to and from a remote server, communicating with a software application on a mobile communication device, and the like. For example, if unauthorized use or unauthorized biometric data is inputted into charger 100 or biometric sensor 102, a switch embedded in biometric sensor may deactivate the charger or otherwise prevent use. The switch may be any type of switch, for example a software switch, data switch, mechanical switch, or the like. In some alternative exemplary embodiments, mobile communication device charger 100 may also have capabilities to actively couple the charger 100 to a mobile communication device and prevent its removal, or deny access to mobile device connector 108 until authorized access is made via biometric sensor 102.

In still a further exemplary embodiment, the biometric sensor 102 may be any type of biometric device. For example, the biometric sensor 102 can be a fingerprint reader or sensor, as shown in exemplary FIGS. 1A and 1B.

Alternatively, the biometric device could be a finger vein scanner, retinal scanner, or the like. Thus, a user may put his or her finger (or other appropriate body part) in a sensing area of the biometric sensor 102. The biometric sensor 102 may then sense or detect if the body part being scanned is appropriate. It may be appreciated that the charger 100 may include storage, such as memory, and processing capabilities, such as a processor, which may store desired biometric data and allow comparisons to be made to determine if appropriate biometric data is being inputted through the biometric sensor 102. In other exemplary embodiments, the charger body 106 may have communication capabilities, such as a transmitter, that transmits data, in a wired or wireless fashion to an outside processor associated with a database in order to determine if appropriate biometric data is being sensed or otherwise inputted through biometric sensor 102.

In a further exemplary embodiment, and still referring to exemplary FIGS. 1A and 1B, indicators 110 and 112 may be on a front face of body 106 of mobile communication device charger 100. Indicators 110 and 112 may be positioned proximate mobile device connector 108, or may be located on any other portion of body 106, as desired. Indicators 110 and 112 may be LEDs or any other type of light or indicator, as desired. In one example, a first indicator 110 may be lit when charger 100 is in a state where charging of a device is authorized. This may be in situations where appropriate or authorized access has been provided through biometric sensor 102. Alternatively, first indicator 110 may be lit when charger 100 is in a state where access or charging capabilities are available without entry of any biometric data or other access information.

Figure 2:
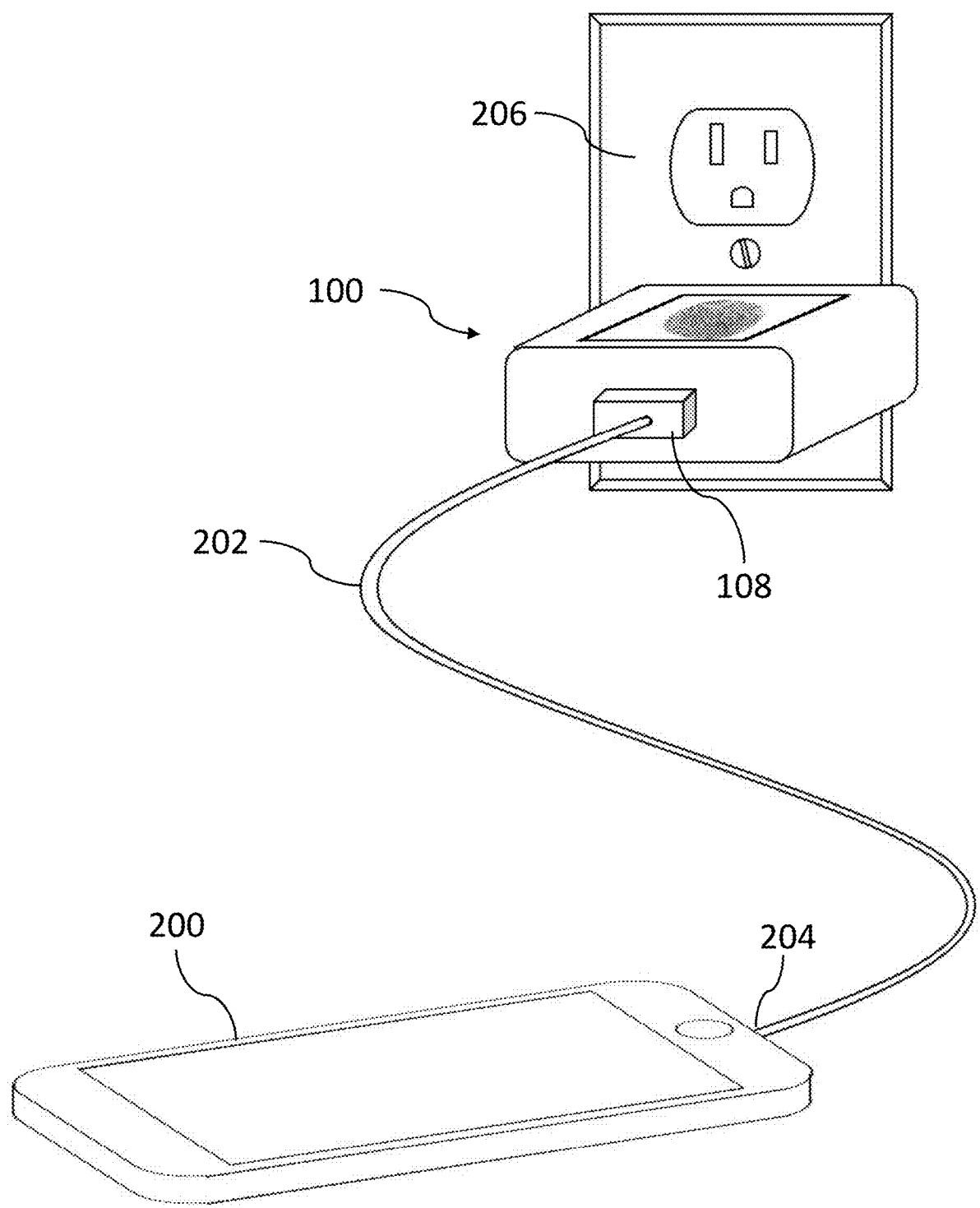
FIG. 2 is an exemplary view of a mobile communication device coupled with a secure mobile communication device battery charger.

Referring now to exemplary FIG. 2, further embodiments of a secure mobile device charger 100 may be shown and described. In this example charger 100 may be communicatively coupled to a mobile device, such as a mobile phone 200. The communicative coupling between phone 200 and charger 100 may be accomplished using cord 202. Cord 202 may be any type of cord, for example a cord associated with a USB. Cord 202 may further be connected to phone 200 via port 204, which may be any type of port capable of providing a couple between cord 202 and phone 200. In different exemplary embodiments, phone 200 and charger 100 then initiate charging, communication, or have different actions take place.

In one exemplary embodiment, charger 100 may be connected to a power source 206 by prongs 104. Then, after charger 100 is connected to phone 200, indicator 112 may indicate that charger 100 is not active or that it will not provide charging capabilities to phone 200. Alternatively, charger 100 may provide or act as a temporary power supply to charge phone 200. Such temporary or inactive charging capabilities may be utilized when charger 100 has not been properly activated or accessed. In such circumstances, indicator 112 may indicate that charger 100 is in a temporary charging mode or an inactive or standby mode. It may be appreciated that when charger 100 is in a temporary charging mode, charger 100 may provide power for a predetermined amount of time, for example the amount of time desired to prompt and have a user enter in biometric information or data. Alternatively, charger 100 may be in a temporary active state for a period of 30 seconds, 1 minute, etc.

After charger 100 is connected with phone 200, biometric sensor 102 may also be activated. In some exemplary embodiments, charger 100 may also be connected to a power source 206 via prongs 104 and it can be appreciated that charger 100 may be connected to a power source 206 when discussing the various exemplary embodiments described herein. Biometric sensor 102 may be activated and provide any of a variety of indications that it is active. For example, biometric sensor 102 may have a backlit pad that illuminates when it is active. Alternatively, an audible alert may be issued from a speaker on body 106 of charger 100. In still further examples, a message may be shown on phone 200 that indicates biometric sensor 102 is active and which further prompts a user to use biometric sensor 102 to fully activate charger 100. A message on phone 202 may further provide instructions to a user on how to use charger 100 and how to otherwise interface with biometric sensor 102.

Figure 3:
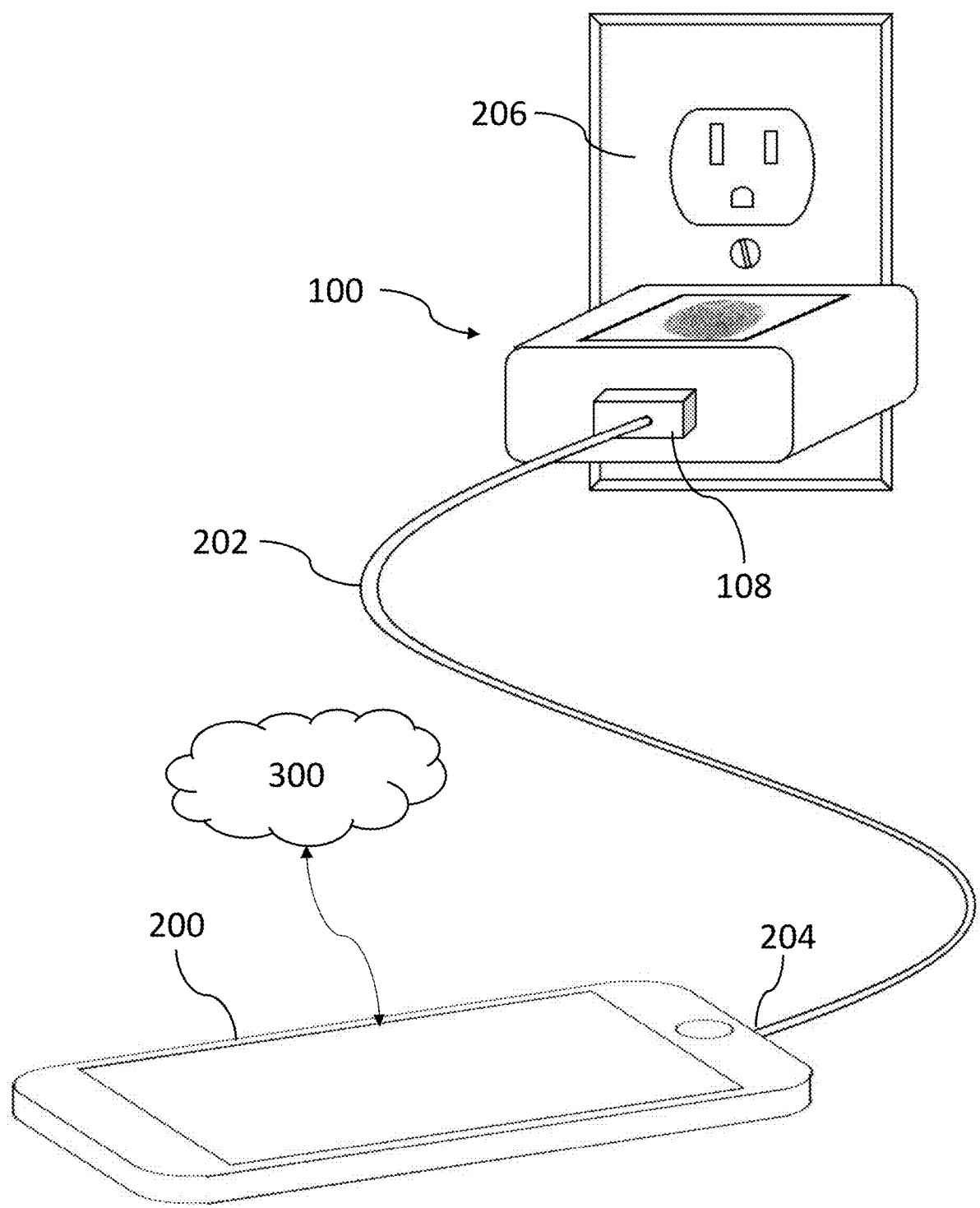
FIG. 3 is an exemplary view of a mobile communication device coupled with a secure mobile communication device battery charger.

Exemplary FIG. 3 can provide another embodiment of secure charger 100. Here, as in exemplary FIG. 2, charger 100 is coupled with phone 200 via cord 202, as described above. Further, a user may be attempting to charge phone 200 using charger 100. Thus, in this exemplary embodiment, a user may attempt to enter biometric information via biometric sensor 102, for example by pressing his or her finger on biometric sensor 102. Biometric sensor 102 may then obtain the biometric data, for example fingerprint data, and compare it with known fingerprint data, such as fingerprint data associated with an authorized user or users of charger 100. After obtaining biometric data, biometric sensor 102 may compare the biometric data with one or more sets of accepted biometric data. For example, a user may have previously set up charger 100 to accept only his or her fingerprint as a way of accessing the charging capabilities of charger 100. This information may be stored in any of a variety of locations, for example a remotely located or cloud based memory 300, a memory on phone 200, or on a memory in charger 100. It may be appreciated that charger 100 can communicate with cloud based memory 300 through wireless data transmission, as otherwise discussed herein. Additionally, charger 100 can communicate with phone 200 in any wired or wireless fashion, as desired. Biometric sensor 102 may communicate with any of these items, as well as a processor associated with any of memory 300, phone 200, or charger 100 in order to compare the inputted biometric data with known or authorized biometric data. If the biometric data inputted into biometric sensor 102 is authorized, charger 100 may activate or enable certain capabilities, such as the ability to charge mobile phone 200, and indicator 110 may illuminate (or provide some other type of alert) that charger 100 is active.

Alternatively, in some other exemplary embodiments, if the biometric data inputted into biometric sensor 102 is compared by a processor with biometric data in a memory and determined to be unauthorized biometric data, or otherwise not recognized biometric data, charger 100 may remain in a standby state, may deactivate any charging capabilities, or otherwise prevent unauthorized users or devices from charging using charger 100. It may be appreciated that such unauthorized access may be accompanied by a notification on the mobile device of the unauthorized user. Additionally, a notification may be transmitted to an authorized user's device indicating that another party attempted to access the charging capabilities of charger 100. Alternatively, when the authorized device is reconnected to charger 100, charger 100 may transmit a message about the unauthorized access at that time.

Figure 4:
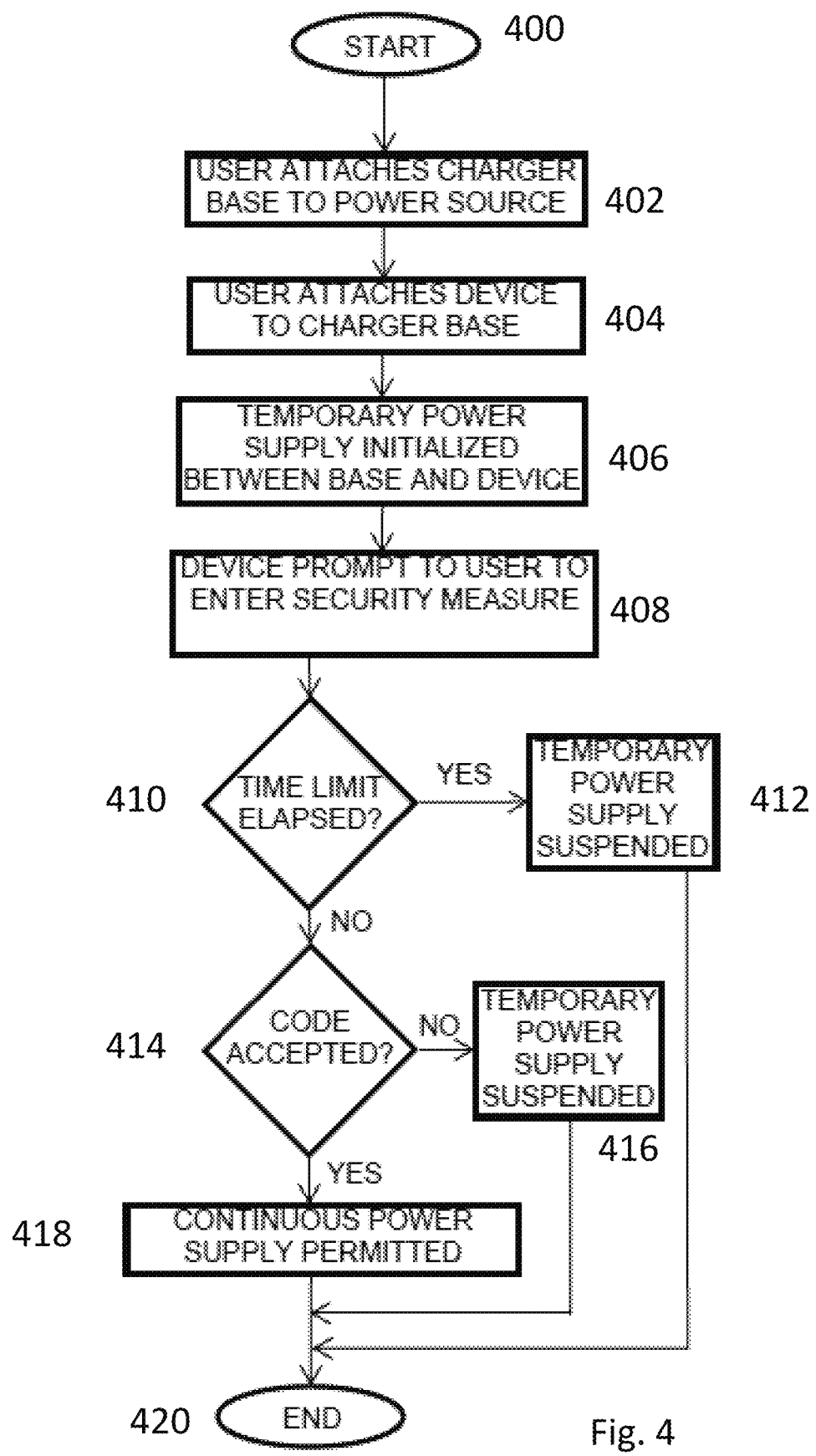
FIG. 4 is an exemplary decision tree associated with a secure mobile communication device battery charger.

In another exemplary embodiment, and referring now to FIG. 4, a method for providing charging capabilities or power to an electronic device, such as a mobile device, may be shown and described. Here, in 400 a mobile device charger may be presented and, at 402, the mobile device charger may be connected to a power source, such as a power outlet or other device that can supply electricity. Then, in 404, a device may be attached or coupled to the charger. Following this, in 406, power may be temporarily supplied from the charger to the mobile device it is connected to. As described in other exemplary embodiments, this power may be delivered for a set amount of time or any other increment, as desired.

Still referring to exemplary FIG. 4, after the device is connected to the charger and power is temporarily supplied, in 408 the device may prompt a user to enter a security measure. As discussed in examples herein, the security measure may be biometric information entered via a biometric sensor. However, in other exemplary embodiments, the security measure could be a number, such as a four digit code or the like, password, or any other security measure, as desired. In 410, the charger (or a processor associated with the charger) may determine that the predetermined amount of time has elapsed. In such cases, in 412, the temporary power would be suspended or cut off and the charger would be deactivated. Alternatively, if, in 410, the predetermined time has not run out, a user may still enter a security measure, as prompted in step 408.

In 414, if an improper security measure is supplied to the charger, the temporary power will be suspended, as shown in 416. This can be done by any desired form of comparison done with a processor and memory, as described herein. Alternatively, if a security measure is reviewed by the charger and accepted, in 418 the charger may be fully activated and continuous, uninterrupted power may be supplied to the device. Power may then be supplied, or the charger will remain inactive, depending on the above-described circumstances, until 420 when the device is disconnected from the charger or the charger is otherwise disconnected from a power supply.

Figure 5A:
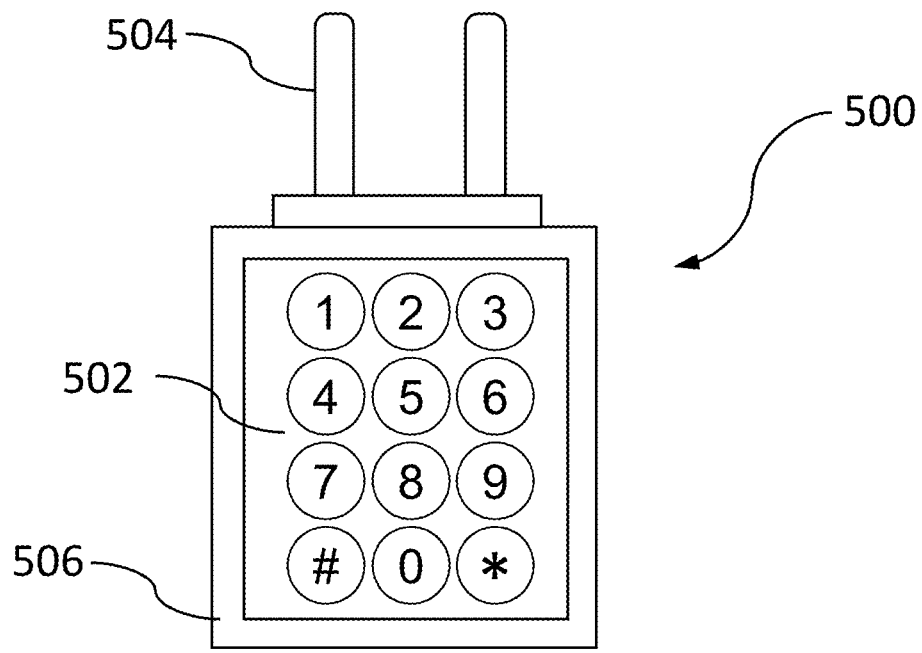
FIG. 5A is an exemplary view of another mobile communication device battery charger.
Figure 5B:
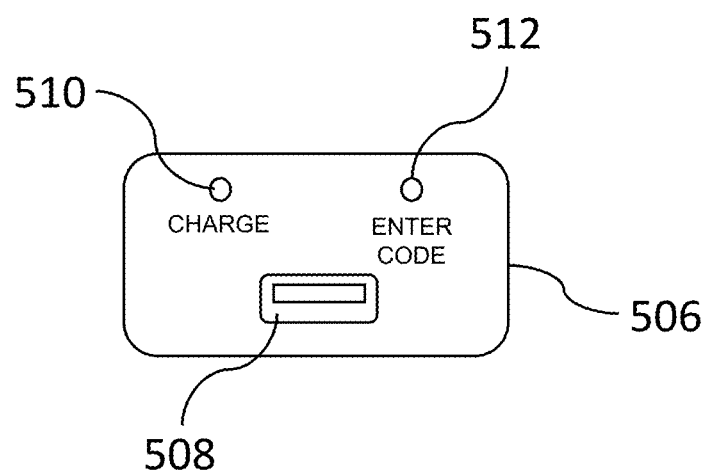
FIG. 5B is another exemplary view of another mobile communication device battery charger.

In exemplary FIGS. 5A and 5B, another secure mobile device charger 500 may be shown. Similar to that shown in exemplary FIGS. 1A and 1B, charger 500 may include any of a variety of components. In particular security measure input area 502 may be any type of security measure input device. In the exemplary embodiments shown in FIGS. 5A and 5B, security measure input device 502 may be a keypad. In this exemplary embodiment, a passcode or personal identification number may be entered to activate charger 500. Alternatively, security measure input device 502 may be a pattern recognition tool that allows a user to draw or swipe a pattern to determine if it matches a preselected or authorized pattern. In still other exemplary embodiments, any other security measure input device 502 may be used as desired.

In still other exemplary embodiments, a secure mobile device charger, such as charger 100, may be used in a variety of environments and circumstances. In one example, charger 100 may be a personal use device. In such embodiments, a user may assign any desired security measure, such as biometric fingerprint data, to the charger and may be the only authorized user of charger 100. In further examples, charger 100 may have any number of authorized users that can input biometric data or other data in order to access the capabilities of charger 100. In other examples, charger 100 may be associated with a payment portal. In such examples a user may deposit money into a payment portal associated with charger 100. The payment portal may then prompt the user to enter biometric data, such as a fingerprint, on a sensor associated with the payment portal. This information may then be transmitted or otherwise shared with the charger 100 so that, upon payment of the appropriate funds, charger 100 can be activated by the paying user and authorized use of charger 100 may take place. Such an exemplary embodiment may allow access to any of a variety of desired users and may prevent undesired or unauthorized access. Further, it may be appreciated that, as in other examples described herein, any desired security measure or measures may be used alone, or in combination.

In still other exemplary embodiments, it may be envisioned that data may be transmitted via power lines. As such, exemplary embodiments of a mobile communication device charger 100 may be expanded and adapted in order to support authentication at various segments in power delivery or in power delivery circuits.

For example, according to an exemplary embodiment, a power feed may be configured to transmit, via a power line data transmission, one or more codes or a set of codes to be transmitted to the mobile communication device charger 100, which may operate as a receiver for such a data transmission. In an exemplary embodiment, a code may be a fixed code or set of codes, or may be a dynamic code or set of codes (such as, for example, an algorithmically generated and/or random code) or a combination of the two as may be desired. In some exemplary embodiments of a power feed, such a code or set of codes may be provided by a wall outlet, a circuit breaker, an electrical meter, an electrical transformer, an electrical generator coupled to the power feed, or any other device that may be coupled to the power feed, such as may be desired. In some exemplary embodiment, such codes may be inserted into the power feed at more than one of the multiple possible locations.

The mobile communication device charger 100 may then verify the one or more codes before providing or denying access or capabilities associated with the charger. In some exemplary embodiments, the mobile communication device charger 100 may only provide such capabilities if a certain code or set of codes is read; for example, the charger may be restricted to use in particular locations, or the user may configure the charger to be usable only in particular locations. (For example, according to an exemplary embodiment, a user may, upon plugging a mobile communication device charger 100 into an outlet, authorize the use of the outlet via a mobile device that has been configured to communicate with the charger 100, which may cause the charger 100 to temporarily or permanently store the code or set of codes being transmitted by the outlet as "authorized codes.") In another exemplary embodiment, the mobile communication device charger 100 may deny such capabilities if a certain code or set of codes (such as an incorrect code, or a code indicating that the outlet is provided in an area where charging is not permitted, such as a secure area where communications devices are restricted from use) is read.

In an exemplary embodiment, a code or set of codes provided by an outlet may be used in combination with another security device, such as a biometric device 102 or numerical passcode device mounted on the body 106 of the charger 100. In some exemplary embodiments, the other security device (such as biometric device 102) may be used to provide multi-factor authentication, requiring the user to both authorize the use of the charger 100 (or use the charger 100 in an authorized location) and provide the additional biometric authorization or other authorization. In some exemplary embodiments, the other security device may be used to authorize the use of the charger 100 in the specific outlet; for example, in an exemplary embodiment, a user may insert a charger 100 into an outlet and provide a biometric authorization, whereby the charger 100 may permanently (or temporarily) store the code transmitted by the outlet as being a valid code linked with the biometric authorization. In some exemplary embodiments, a user authorization may be temporary and may expire, and a user may need to re-provide the security measure from time to time in order to continue using the charger 100 to charge their device; however, in some exemplary embodiments, the user authorization may be extended if the outlet transmits a code or set of codes that is received by the charger 100, as this may allow the charger 100 to determine that it has not been removed from the outlet and placed in another outlet, reducing the need for the charger 100 to request reauthorization.

In some exemplary embodiments, the charger 100 may be transmitted a code other than through a power line or outlet. For example, according to an exemplary embodiment, a code or set of codes may be embedded by a power supplier in any other type of transmissions that may be received by the charger 100, whether directly or indirectly; such transmissions may include, for example, television broadcast transmissions, phone and data transmissions, or local transmissions from a local device. For example, according to an exemplary embodiment, a code may be embedded on a third-party device that may be inserted onto a circuit by an end user or by an electrician (or by another similar party), and may provide an authorization code to just that outlet (or, in combination with a number of such devices, to a plurality of outlets). This may allow a user to, for example, restrict one or more charging devices 100 provided in their home to function only in their home, or may allow a business owner to restrict one or more charging devices provided in their business to function only in their business, deterring theft of the charging devices 100.

In an exemplary embodiment, the use of such a security code or set of security codes, whether provided by the power company, a third-party device of an end user, and so on, may enable the authentication process to be tied to a physical location rather than an individual, or rather than only to an individual. In some exemplary embodiments, once restricted to a physical location, chargers 100 may further be restricted to particular individuals or groups of individuals, as may be desired. For example, according to an exemplary embodiment where a code is provided to chargers 100 through an outlet or set of outlets in a home (by a power company, by the use of local devices integrated into the home circuitry, or by any other such method as may be desired) the chargers 100 may further restrict access to the members of the family household. In another exemplary embodiment, when a code is provided to chargers 100 through an outlet or set of outlets in a business, the chargers 100 may further restrict access so that only employees are authorized users. The chargers 100 may similarly be restricted in any other application, such as when provided in any other public place, such as may be desired.

For example, according to an exemplary embodiment, chargers 100 may be restricted to a particular public place and may further be restricted to users who have become authenticated, for example by subscribing to a charging service or by paying a charging fee. For example, according to an exemplary embodiment, a public place in which many users may be using their electronic devices for extended periods of time without necessarily having access to a charger (such as, for example, an airport or coffee shop) may have such chargers provided, as may be desired. In an exemplary embodiment where a charging fee may be required, a user may pay to use the charger 100 (at, for example, a nearby authorization kiosk), and the charger 100 may then operate until the user's device is fully charged, may operate for a period of time, may provide a certain amount of charge, or may otherwise operate as may be desired. In an exemplary embodiment where a subscription model is used, the user may pay a subscription fee (such as a monthly fee) in order to use the service, and may be granted access to the service if their subscription fee has been paid. In some exemplary embodiments, the charger 100, or, for example, a companion app for the charger 100 may handle multiple current fees or subscriptions; for example, a user may use a first service for local travel and a second service for international travel, and may subscribe to each. In some exemplary embodiments, the subscription of a user to a service or the payment of a charging fee may be set via, for example, a toggle switch, a digital selection, an app-specified or app-generated selection, or another such method as may be desired.

In some exemplary embodiments, a charger 100 may be assigned to a user which may be functional (or may be functional in some outlets such as those of certain airports) only when a subscription or fee has been paid. In this manner, the charger 100 itself may be a subscriber to a particular electrical source, such that the charger 100 is only permitted to draw as much charge as is available to it based on the subscription service it is subscribed to. The source may likewise be configured such that only authorized chargers 100 having a subscription to the source are permitted to be used with it; for example, according to an exemplary embodiment, the source may be configured to shut down the power supplied to a particular outlet if the outlet is broadcasting a code, power is drawn from that outlet, and no return response from an authorized charger 100 is provided in response to the code.

According to an exemplary embodiment, a wall outlet, USB port, or other power-providing device may be directly provided with or may be refitted to include an embedded authorization code provider. Such an embodiment may allow legacy chargers 100 to be used in location-based authentication. For example, according to an exemplary embodiment, such an authenticator may be provided in a USB charging port, power outlet, or similar device of an airplane, of an airport, or of an automobile or other vehicle.

According to an exemplary embodiment, in addition to a biometric component 102 or other such feature integrated into the body 106 of the charger 100, additional components may be integrated into the charger 100 in order to broaden the capabilities of the charger 100, such as, for example, the capabilities of the charger 100 that are related to or controlled by the biometric component 102 or by another such feature. For example, in some exemplary embodiments, additional modifications may be made to the charger 100 in order to improve circuit power conditioning, regulation, or performance, such as may be desired.

For example, according to an exemplary embodiment, the charger 100 may be modified in order to improve power condition monitoring. In typical electrical devices, the power flow, or condition, may fluctuate, which may be undesirable from the perspective of both the owner of the device that is causing the load and the power supplier. A device owner may wish to improve power quality through conditioning because of potential adverse effects of poor power condition on their device, and a power supplier may wish to improve quality in order to reduce waste and mitigate "pollution" of the supply network. A power supplier may also want to obtain additional situational awareness of power condition or other load-level information, right down to the outlet location at which power is drawn, if such information is available.

In an exemplary embodiment, one or more condition-monitoring instruments may be integrated into a charger 100. Such condition-monitoring instruments may be configured to monitor and then retransmit one or more condition-monitoring metrics. In some exemplary embodiments, the condition-monitoring metrics may be linked to the ID of the owner of the charger 100, which may be used to provide additional information to the supplier or may, for example, be used to track historical usage.

In some exemplary embodiments, this may then be used in order to compute one or more analytics, such as "big data" analytics, about a specific user and the power usage of the specific user. For example, such analytics may be applicable to the user, to the devices of the user, and to the sources of power used by the user. These analytics may then be used to, for example, better market products to the user or may be used to plan electrical power production more effectively. Beneficiaries of the analytics may include, for example, the charger owner, who may be provided with information about the power consumption of their devices or the power consumption of devices powered with their charger device; the power supplier, who may be provided with information as to the power consumption of devices on their electrical distribution network; the manufacturers of one or more of the user's devices, such as, for example, a smartphone, tablet computer, or laptop computer of the user, or the manufacturer of the charger itself; or any other applicable beneficiaries such as the maintenance personnel of a commercial facility in which chargers 100 are in common usage. For example, according to an exemplary embodiment, a charger 100 may obtain geolocation information from one or more sources (such as, for example, an onboard GPS device or a data link with one or more mobile devices configured to collect location information) and may then transmit this location data combined with authentication information. This may be provided to, for example, power companies, which may then use it to derive relevant information about power condition in one or more geographic areas. This may further be provided to, for example, device manufacturers, which may then use it to gain relevant information about individual devices and device models, and use it to improve future models by improving the reactive power characteristics of the devices or otherwise improve them.

In some exemplary embodiments, this may likewise be used for billing. For example, it may be convention to charge users more for abnormal loads such as low-power-factor loads, because of problems such as harmonic pollution that they create for the supplier. Certain battery chargers, such as, for example, the battery chargers for electric vehicles or other large-scale devices, have been identified as being a cause of harmonic distortion on an electrical power distribution network. As such, a user that is identified as creating problems for the supplier in this manner, such as a user that has a large-scale battery charger 100 such as an electric vehicle battery charger may be billed based on the reactive power of the load as measured at the load.

According to an exemplary embodiment, a charger 100, or device associated with a charger such as a plug or USB charging port, may have one or more quality or performance monitoring instruments.

For example, according to an exemplary embodiment, condition monitoring for a charger 100 and a source, which may facilitate determination of charger/source equipment quality, performance, integrity, condition, and the like, may be accomplished by inserting two condition monitors into the charger 100, one condition monitor being provided at the power entrance side of the charger 100 and one condition monitor being provided at the exit side of the charger 100. Between the two condition monitors may be provided various components of the charger 100, such as a charger on-off switch tied to an authenticator (such as, for example, a biometric sensor 102), power conditioners, power regulators, and other similar devices such as may be desired.

In order to perform condition monitoring and determine, for example, the power quality of power provided through the charger, the condition metrics at each end of the charger 100 may be calculated, and may be compared. In this manner, the entrance metric and exit metric may each be determined, and may be compared in order to determine the condition of the charger device 100 as a whole as well as of its components.

When utilizing the device or app-based authentication such as is described elsewhere, such device or app-based authentication may be coupled with a charger performance monitoring and visualization system, by which the performance of the charger can be monitored and data on the device effect on the charger may be determined and may be provided to the user, which may be in the form of, for example, a device diagnostic. For example, if a short or another negative condition exists in the device that is receiving the charge, the condition in the device may be detected by analysis of the two condition monitors, or more specifically through analysis of the entrance metric calculated by the entrance monitor and the exit metric calculated by the exit monitor in order to determine the variance in the condition data between the entrance and exit metrics.

According to an exemplary embodiment, such information can be provided to, for example, an owner of the charger, a power supplier, a device manufacturer, or any other party such as may be desired. For example, according to an exemplary embodiment, if the user's device is determined to have some kind of performance issue or negative condition, such as, for example, a short, the user may be notified of this information in order to ensure that the user can repair or replace their device. The manufacturer of the device may also be notified, so that they can have data reflecting the occurrence of specific performance issues or negative conditions that may affect their devices, such as shorts or other such issues.

In some exemplary embodiments, it may be understood that the charger 100 may be used for other devices or batteries other than small portable electronics such as smartphones or other mobile devices. For example, according to an exemplary embodiment, charger 100 may be used for larger computers, for example laptop computers or battery backup systems for a desktop computer, or may be used to charge the batteries of electric vehicles, such as may be desired.

In some exemplary embodiments, it may be understood that the charger 100 may be used in various vehicles, such as, for example, airplanes, trains, boats, and so forth. It may be understood that some or all of these vehicles may have different power requirements at different times; for example, an airplane may be less equipped to provide electrical power to devices during take-off and landing. As such, airline companies may seek ways to lessen the electrical draw in airplanes at various times. Airline companies, or other transportation companies, may also desire more information about their passengers; for example, they may desire to see mobile device usage patterns of customers in order to determine when those customers are seeking entertainment (and what type of customers are seeking entertainment at which times) in order to better schedule in-flight entertainment. Transportation companies may also wish to determine which electrical outlets, USB charging ports, or other such devices that are provided on their vehicles are problematic, are failing, or have failed, in order to allow these outlets to be replaced or fixed before they become a problem for the customers or before they present an electrical hazard. Transportation companies may also desire any other information that may be provided that may be relevant to their market performance.

According to an exemplary embodiment, a charger 100 may be configured to use device-based or app-based authentication instead of or in addition to another authentication method. For example, according to an exemplary embodiment, a mobile device of a user that is connected to a charger 100 may be used as the authentication code source for a charger 100. In an alternative exemplary embodiment, any other device of a user, such as a laptop computer or an electric car, which may be coupled to a charger 100 may also provide authentication. According to an exemplary embodiment, a specific application on the device may be used to provide authentication, and may be launched by the user in order to provide authentication or may be running at all times. In this manner, a code may be provided to the charger 100 without having to provide any additional authentication and without having to provide a code through the power outlet, which may be, for example, a standard power outlet not incorporating any kind of authentication mechanism.

According to an exemplary embodiment, a device of the user may be configured to provide an authentication code to any device which may require authentication to be provided before charging. For example, the device of the user may be configured to supply authentication codes to the charger device 100, the outlet, or to any other device such as may be desired. This may ensure that, when a user plugs their device into a charger 100, the user does not then need to main in the physical presence of the charger 100 to continue providing authorization to the charger when requested. This may ensure that, for example, a family member can plug in their device for charging without providing biometrics or any other authorization such as an authorization code (which may, for example, be useful for young children with their own tablet devices who cannot necessarily be relied on to remember an authorization code). Likewise, in some exemplary embodiments, the physical proximity of a user's device may be sufficient to authorize the use of the charger 100; this may, for example, allow a charger 100 to be used with other devices, such as the devices of guests, so long as it is in the proximity of the user's device.

According to an exemplary embodiment, a charger 100 may have a code receiver instead of, or in addition to, a biometric sensor 102. In an exemplary embodiment, a code receiver may receive a code transmitted by a mobile device or other device of the user, may determine, based on this received code, whether the user has access to the charger 100, and may charge a device of the user if so. In some exemplary embodiments, transmission of the code may be wireless, such that a device may be used to authorize the charging of devices remotely and so that other devices may be charged, or may be based on a wired connection of the device to the charger. In an exemplary embodiment, a code receiver may be provided alongside a biometric sensor 102, which may be used to provide multi-factor authentication if such is desired; alternatively, a user may only need to provide authentication from one of the two sources, allowing the user some flexibility as to how to authorize the use of the charger 100.

According to an exemplary embodiment, a user may have some ability to remotely provide authorization to use a charger 100. For example, a user may not be present in the room or in the area when someone else (such as, for example, a family member) wishes to use the charger 100. Alternatively, a user may wish to charge a device that takes an extended period of time to charge, such as, for example, a portable power bank, and may retain possession of their mobile device while they leave the device to charge.

In some exemplary embodiments, certain methods by which a user may provide temporary or extended-temporary remote user authentication to a charger 100 may be provided. According to one exemplary embodiment, on a version of a charger 100 having a biometric sensor 102, remote access may be provided to the biometric processor (rather than the biometric sensor 102) may be provided by a wireless communication protocol, such as through Wi-Fi or as a signal riding on the power provided to the charger 100, or by another communications mechanism as may be desired. The authentication code that would be provided by a valid biometric scan from the biometric sensor 102 may then be directly provided to the biometric processor.

In some exemplary embodiments, in order to generate this code, a user may have a portable biometric scanner configured to generate the same code (or a similar code, or otherwise valid code) as the biometric sensor 102 of the charger 100 in response to a valid biometric scan. The user may scan the biometric in question (for example, their fingerprint), the remote code may be transmitted to the charger 100, and the charger 100 may be enabled for some period of time. Other remote authorization devices other than a portable biometric scanner may also be understood; for example, in an exemplary embodiment, a user may have a portable wirelessly-enabled dongle having a button or activation switch that the user may likewise be able to use to generate the authentication code that would be provided by a valid biometric scan from the biometric sensor 102.

In some exemplary embodiments, the authentication code may be provided by another method. For example, according to an exemplary embodiment, the authentication code may be provided by an application running on the user's mobile device. For example, when the user loads an application that may be used to provide an application-specific authentication to the charger 100, the application may provide a button or other dialog by which the user can select to remotely authorize the use of the charger 100.

In some exemplary embodiments, the charger 100 may be configured so that a user may have to first authorize the use of the charger 100 in person, for example by coupling a device to the charger 100 or scanning a fingerprint on the biometric sensor 102 of the charger 100, and may then be able to extend the length of time over which the charger 100 stays active by providing one or more remote authorizations.

In an exemplary embodiment, certain information, such as, for example, identity information (such as, for example, the identity of the user, the identity of one or more mobile devices that the user has paired with the charger 100 or otherwise configured to use the charger 100, the identity of a user group that the user has permitted to use the charger 100, a user type that the user has permitted to use the charger, and so forth), power consumption or carbon signature information, or any other such information as may be desired, may be provided to the user in any form as may be desired.

For example, in an exemplary embodiment, it may be desired to couple one or more chargers 100 to a social media profile, such that the chargers 100 can provide public information as to the power consumption of the charger or chargers 100. This may allow, for example, a business that wishes to appear environmentally-conscious to inform the public about how much power they are consuming and how much power they are saving through the use of their systems.

In an exemplary embodiment, one or more of the above qualities, such as identity information, may be provided to a user, a power supplier, a device manufacturer, or any other party, for a purpose such as boosting the public opinion and corporate reputation of a corporate user or such as providing more detailed demand information on the basis of which power can be more effectively supplied. Likewise, in addition to information and usage information, information such as the conditions of power sources and equipment may be provided. In this manner, an incentive business model may be provided to monitor, capture, report, and thereby monetize the saving of power and more effectively perform maintenance.

The foregoing description and accompanying figures illustrate the principles, embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for charging a mobile communication device, comprising:
    a mobile communication device;
    a power source;
    a cord; and
    a mobile communication device charger, the mobile communication device charger comprising:
        one or more body housing battery charging elements;
        a power connector;
        a mobile device connector;
    wherein the mobile communication device charger is coupled to the power source and the mobile communication device is coupled to the mobile communication device charger with the cord;
    wherein the mobile communication device charger is configured to receive, from the power source, in the form of a variation in electrical power supplied by the power source, an authorization code, the mobile communication device charger further being configured to validate the authorization code by performing a comparison between the authorization code and a stored authorization code stored in a memory; and
    wherein, following the receipt of the authorization code from the power source, the mobile communication device charger is configured to supply power to the mobile communication device when the authorization code matches the stored authorization code and is configured not to supply power to the mobile communication device when the authorization code does not match the stored authorization code, and wherein the authorization code is supplied based on at least one of an indication that a user associated with the mobile communication device charger has paid for a subscription, or an indication that the user associated with the mobile communication device charger has paid a charging fee.

2. The system of claim 1, wherein the system further comprises a biometric sensor configured to read biometric input data and configured to receive a biometric input.

3. The system of claim 2, wherein the system is further configured to perform, with a processor, a comparison between the biometric input and authorized biometric data stored in a memory that determines a charging status of the mobile communication device charger.

4. The system of claim 2, wherein the system is configured to perform multi-factor authentication with the biometric sensor and the authorization code.

5. The system of claim 1, wherein the system further comprises an authorization code provision device coupled directly to and in series with an electrical outlet, and wherein the authorization code is supplied by the authorization code provision device.

6. The system of claim 1, wherein the authorization code is supplied from at least one of a wall outlet, a breaker, an electrical meter, a transformer, or an electrical generator.

7. The system of claim 1, wherein the authorization code is at least one of a fixed user-specific code, a code generated according to a predetermined algorithm, or a randomly-generated code.

8. The system of claim 1, wherein the mobile communication device charger further comprises an entrance condition monitor and an exit condition monitor, the entrance condition monitor provided at the power connector and configured to determine an entrance condition metric, the exit condition monitor provided at the mobile device connector and configured to determine an exit condition metric.

9. The system of claim 8, wherein the mobile communication device charger is configured to transmit a condition metric, the condition metric derived from the entrance condition metric and the exit condition metric.

10. The system of claim 8, wherein the mobile communication device charger is configured to perform at least one condition diagnostic on the mobile communication device.

11. The system of claim 1, wherein the mobile communication device further comprises a device-based authenticator, the device-based authenticator being configured to transmit a device code to the mobile communication device charger;
    wherein the mobile communication device charger is configured to receive, from the mobile communication device, the device code, the mobile communication device charger further being configured to validate the device code by performing a comparison between the device code and a stored device code stored in a memory;
    wherein, following the receipt of the device code, the mobile communication device charger is configured to supply power to the mobile communication device when the device code matches the stored device code and is configured not to supply power to the mobile communication device when the device code does not match the stored device code.

12. The system of claim 11, wherein the mobile communication device charger is configured to transmit at least one of a condition or a device diagnostic to the mobile communication device.

13. The system of claim 1, wherein the mobile communication device charger is configured to upload a user identity and at least one of a power consumption, a condition metric, or a carbon signature to a social media profile.

14. The system of claim 1, wherein the mobile communication device charger further comprises a GPS receiver; and
wherein the mobile communication device charger is configured to determine a charger geolocation by determining, from the GPS receiver, a mobile communication device charger geolocation, and is configured to transmit the mobile communication device charger geolocation.

15. The system of claim 1, wherein the mobile communication device charger has a data connection to the mobile communication device; and
wherein the mobile communication device charger is configured to retrieve a mobile communication device geolocation from the mobile communication device through the data connection, and is configured to transmit the mobile communication device geolocation.

16. The system of claim 1, further comprising a remote authorization device, the remote authorization device configured to transmit a temporary authentication code at least one of wirelessly or as a signal riding on the power provided by the power source; and
wherein, following the receipt of the temporary authentication code, the mobile communication device charger is configured to supply power to the mobile communication device when the temporary authorization code matches a stored temporary authorization code.

17. The system of claim 1, wherein the mobile communication device charger further comprises a processor and is configured to determine, with the processor, whether a predetermined amount of time has passed during battery charging of the mobile communication device from the mobile device connector.

* * * * *